United States Patent
Hart et al.

(10) Patent No.: US 12,428,588 B2
(45) Date of Patent: Sep. 30, 2025

(54) SYNERGISTIC VISCOSIFIERS FOR CLAY-FREE, WATER-BASED DRILLING FLUIDS

(71) Applicant: Halliburton Energy Services, Inc., Houston, TX (US)

(72) Inventors: Emily Hart, Houston, TX (US); Hui Zhou, Houston, TX (US); William W Shumway, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/473,930

(22) Filed: Sep. 25, 2023

(65) Prior Publication Data

US 2025/0101288 A1    Mar. 27, 2025

(51) Int. Cl.
*E21B 21/00* (2006.01)
*C09K 8/08* (2006.01)
*C09K 8/12* (2006.01)

(52) U.S. Cl.
CPC .............. *C09K 8/12* (2013.01); *C09K 8/08* (2013.01); *E21B 21/00* (2013.01)

(58) Field of Classification Search
CPC ................................ C09K 8/12; E21B 21/00
See application file for complete search history.

(56) References Cited

U.S. PATENT DOCUMENTS

| | | | |
|---|---|---|---|
| 9,969,921 B2 | 5/2018 | Wang et al. | |
| 10,508,229 B2 | 12/2019 | Zhou et al. | |
| 2004/0192561 A1* | 9/2004 | Kippie | C09K 8/08 507/200 |
| 2006/0079405 A1 | 4/2006 | Dobson, Jr. et al. | |
| 2016/0032197 A1* | 2/2016 | Weisner | C08B 31/00 536/124 |
| 2017/0198189 A1 | 7/2017 | Panamarathupalayam | |
| 2017/0218251 A1* | 8/2017 | Deville | C09K 8/035 |
| 2017/0369617 A1* | 12/2017 | Zha | C08F 222/10 |
| 2018/0194985 A1* | 7/2018 | Boul | C09K 8/035 |
| 2018/0201820 A1 | 7/2018 | Eyaa Allogo et al. | |
| 2021/0222048 A1 | 7/2021 | Panamarathupalayam | |
| 2021/0230473 A1* | 7/2021 | Trahan | C08B 15/06 |
| 2021/0332285 A1* | 10/2021 | May | C09K 8/514 |
| 2021/0355366 A1* | 11/2021 | Jadhav | C04B 14/104 |

FOREIGN PATENT DOCUMENTS

| | | |
|---|---|---|
| WO | 2015122886 A1 | 8/2015 |
| WO | 2016072993 A1 | 5/2016 |
| WO | 2019175792 A1 | 9/2019 |
| WO | 2020257002 A1 | 12/2020 |

* cited by examiner

*Primary Examiner* — Silvana C Runyan

(74) *Attorney, Agent, or Firm* — Sheri Higgins Law, PLLC; Sheri Higgins (57) ABSTRACT

A water-based drilling fluid can include a first and second viscosifier of a cross-linked starch and a cross-linked acrylamide-based polymer. The acrylamide-based polymer can be crosslinked and optionally include hydrophobic monomers. The viscosifiers create a synergistic effect that imparts desirable properties to the drilling fluid compared to using either of the viscosifiers alone. The viscosifiers can be used as an alternative to other types of viscosifiers such as xanthan gum.

19 Claims, 1 Drawing Sheet

SYNERGISTIC VISCOSIFIERS FOR CLAY-FREE, WATER-BASED DRILLING FLUIDS

TECHNICAL FIELD

Viscosifiers can be added to drilling fluids to help suspend drill cuttings during an oil or gas drilling operation. The drilling fluid can be a clay-free drilling fluid.

BRIEF DESCRIPTION OF THE FIGURES

The features and advantages of the embodiments will be more readily appreciated when considered in conjunction with the accompanying FIGURES. The figures are not to be construed as limiting any of the embodiments.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

A wellbore is formed using a drill bit. A drill string can be used to aid the drill bit in drilling through the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid is generally a slurry or an emulsion and contains a liquid continuous phase and soluble and/or insoluble additives. The drilling fluid performs various functions, such as cooling the drill bit, maintaining the desired pressure in the well, and carrying drill cuttings upwardly through the annulus between the wellbore and the drilling pipe.

During wellbore drilling, it is important to maintain shale control or formation stability, so the walls of the wellbore do not cave in or slough off. Therefore, a drilling fluid can be a clay-free fluid to help maintain formation stability. Moreover, a minimum amount of pressure should be maintained within the wellbore to maintain formation stability. However, the amount of pressure exerted on the wellbore walls must also be balanced to be below the pore pressure or fracture gradient of the subterranean formation. Thus, there is a balance between exerting too much pressure and not enough pressure.

Another factor that is crucial for a drilling fluid is the viscosity of the fluid. Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)) or expressed in units of Pascals/second (Pa/s). However, because a material that has a viscosity of 1 P is a relatively viscous material, viscosity is more commonly expressed in units of centipoise (cP), which is 1/100 P. Viscosity and pourability and pumpability are related. A drilling fluid should be viscous enough to properly suspend and carry drill cuttings up the annulus to the surface but not be too viscous to be pumped into the formation. A viscosifier can be added to a drilling fluid to increase the viscosity to a desired viscosity or within a range of desired viscosities. The viscosity of a fluid can also affect the equivalent circulating density (ECD). ECD is the effective circulating density exerted by a fluid against the formation taking into account the flow rate and pressure drop in the annulus above the point being considered and measured as the difference in a drilling fluid's measured surface density at the well head and the drilling fluid's equivalent circulating density downhole. By way of example, if the viscosity of a 12 pound per gallon (ppg) drilling mud is high, then the mud may have an ECD of 14 ppg, which may be above the pore pressure or fracture gradient. Accordingly, a clay-free drilling mud can help the ECD be closer to the actual density of the drilling mud.

Some viscosifiers impart better properties to a drilling fluid than others. Xanthan gum is one example of such a viscosifier for water-based drilling fluids. Due to xanthan gum's unique structure, it is capable of providing higher viscosities at low shear rates than most other viscosifiers, which aids suspension of the drill cuttings without increasing the viscosity too much at higher shear rates during pumping thereby rendering the fluid unpumpable. However, the supply of xanthan gum that is available is not always consistent. Moreover, when the supply is decreased, the cost of what is available on the market increases—oftentimes resulting in a severalfold increase in cost. Thus, there is a need for new, readily available viscosifiers that perform as well or better than xanthan gum or other viscosifiers.

There are other desirable properties of a drilling fluid in addition to viscosity, pumpability, and equivalent circulating density. Some of the desirable properties include rheology, plastic viscosity, yield point and yield stress, 10-second gel strength, and 10-minute gel strength.

If any laboratory test (e.g., rheology or fluid loss) requires the step of mixing, then the drilling fluid is mixed according to the following procedures. A known volume (in units of barrels) of the aqueous liquid is added to a mixing container and the container is then placed on a mixer base. The motor of the base is then turned on and maintained at the revolutions per minute (rpm) for the particular multi-mixer used. Any of the following ingredients are then added to the aqueous liquid and mixed for at least 5 minutes before adding the next ingredient, wherein the ingredients are added in order of the first ingredient to last ingredient as follows: a viscosifier; a filtration control agent; a shale stabilizer additive; a weighting agent; and a pH buffer. The ingredients can be added at a stated concentration of weight by volume of the drilling fluid, for example, in units of pounds per barrel of the drilling fluid. It is to be understood that any mixing is performed at ambient temperature and pressure—about 71° F. (22° C.) and about 1 atm (0.1 MPa).

It is also to be understood that if any laboratory test (e.g., rheology or fluid loss) requires the test be performed at a specified temperature and possibly a specified pressure, then the temperature and pressure of the drilling fluid is ramped up to the specified temperature and pressure after being mixed at ambient temperature and pressure. For example, the drilling fluid can be mixed at 71° F. (22° C.) and 1 atm (0.1 MPa) and then placed into the testing apparatus and the temperature of the drilling fluid can be ramped up to the specified temperature. As used herein, the rate of ramping up the temperature is in the range of about 3° F./min to about 5° F./min (about 1.67° C./min to about 2.78° C./min) to simulate actual wellbore conditions. After the drilling fluid is ramped up to the specified temperature and possibly pressure, the drilling fluid is maintained at that temperature and pressure for the duration of the testing.

A drilling fluid should exhibit good rheology. Rheology is a measure of how a material deforms and flows. As used herein, the "rheology" of a drilling fluid is measured according to ANSI/API 13B-1 section 6.3, Recommended Practice for Field Testing of Water-based Drilling Fluids as follows. The drilling fluid is mixed. The drilling fluid is placed into the test cell of a rotational viscometer, such as a FANN® Model 35 viscometer, fitted with a Bob and Sleeve attachment and an F1 spring number. The drilling fluid is tested at the specified temperature and ambient pressure, about 1 atm (0.1 MPa). Rheology readings are taken at multiple revolutions per minute "rpm," for example, at 3, 6, 100, 200, 300, and 600 rpm.

Rheology or other measurements can be performed before hot rolling (BHR) or after hot rolling (AHR). As used herein, "hot rolling" is performed according to ANSI/API 131 section 26.8, Recommended Practice for Laboratory Testing of Drilling Fluids as follows. Samples of the drilling fluid are hot-rolled for 16 hours at 150° F. (65.6° C.) in a preheated hot-rolling oven. Pressurization of the hot-roll cell with nitrogen can be used. After 16 h of hot rolling, switch off the oven heat and open the oven door. Roll the samples during the cooling period for at least 30 min prior to removal. Subsequently, cool in ambient air for an additional 30 min. Then cool the cell to ambient temperature by partially immersing the cell in water.

As used herein, the "plastic viscosity" (PV) of a drilling fluid is obtained from the Bingham-Plastic rheological model and calculated as the difference between the 600 rpm and 300 rpm dial readings from the rheology testing, expressed in units of cP. The PV value can affect the equivalent circulating density (ECD) and the rate of penetration (ROP) of a drilling fluid. A low ECD is when the difference between the surface density and the equivalent circulating density downhole is relatively small. A high PV may increase the ECD due to a greater pressure drop in the annulus caused by internal fluid friction. A low PV may help minimize the amount of density increase, or equivalent circulating density caused by pumping the fluid. ROP is how quickly a drill bit forms a wellbore (i.e., the rate at which the drill bit penetrates a subterranean formation). A low PV may indicate that the fluid is capable of drilling rapidly because, among other things, the low viscosity of fluid exiting the drill bit and the ability to use an increased flow rate. In addition to desiring a low PV value, it is also desirable to have a low ECD and a high ROP. Usually, an increase in the viscosity of a drilling fluid, excess colloidal solids, or both, will increase the plastic viscosity of a fluid.

A high yield point is also desirable. The yield point ("YP") is defined as the value obtained from the Bingham-Plastic rheological model when extrapolated to a shear rate of zero. As used herein, the "yield point" of a drilling fluid is calculated as the difference between the plastic viscosity and the 300-rpm dial reading, expressed in units of lb/100 ft$^2$. To convert the units to Pa, the difference is multiplied by 0.48. Similarly, the yield stress or Tau zero is the stress that must be applied to a material to make it begin to flow (or yield) and can be calculated from rheometer readings measured at rates of 3, 6, 100, 200, 300, and 600 rpm. The extrapolation in this case can be performed by applying a least-squares fit or curve fit to the Herchel-Bulkley rheological model.

A fluid can develop gel strength. As used herein, the "10 s gel strength" of a drilling fluid is measured according to ANSI/API 13B-1 section 6.3, Recommended Practice for Field Testing of Water-based Drilling Fluids as follows. After the rheology testing of the drilling fluid is performed, the fluid is allowed to sit in the test cell for 10 seconds (s). The motor of the viscometer is then started at 3 rpm. The maximum deflection on the dial reading is the 10 s gel strength in units of lb/100 ft$^2$. As used herein, the "10 min gel strength" is measured as follows. After the 10 s gel strength test has been performed, the fluid is allowed to sit in the test cell for 10 minutes (min). The motor of the viscometer is then started at 3 rpm. The maximum deflection on the dial reading is the gel strength at 10 min in units of lb/100 ft². To convert the units to Pascal (Pa), the dial reading is multiplied by 0.511.

Moreover, a drilling fluid can have a desired density. If the density is too high, then the ECD, ROP, and pumpability can be negatively affected. Density is reported in units of pounds per gallon (ppg) or kilograms per liter (kg/L).

A drilling fluid can also have a low API fluid loss. Fluid loss is used to determine how much of a base fluid in the drilling fluid can be lost into the pores of the subterranean formation. As used herein, the "fluid loss" of a drilling fluid is tested according to the ANSI/API 13B-1 section 7, Recommended Practice for Field Testing of Water-based Drilling Fluids as follows. The drilling fluid is mixed. The drilling fluid is placed into a filter press cell. For low-temperature/low-pressure test, a filter paper is used and the fluid loss is performed at ambient temperature and 100 psi pressure differential for 30 minutes. For high-temperature/high-pressure test, a filter paper or a porous disk is used and the fluid loss is performed at the desired test temperature and 500 psi pressure differential for 30 minutes. Fluid loss is measured in milliliters (mL) of fluid collected in 30 min or if a blowout occurs before 30 mins the elapsed time and the volume collected is used to calculate the total fluid loss volume. The total mL of fluid loss collected in 30 mins is the API fluid loss for the drilling fluid in mL/30 min. The total volume of filtrate collected is multiplied by 2 if the filter area is 22.6 cm² (3.5 in²).

Previous attempts to replicate the superior performance of xanthan gum were limited to use of another biopolymer such as diutan gum, which is not ideal due to limited use in high-temperature wellbores. Other formulations that mimicked the superior performance of xanthan gum included high concentrations of clays, which can present problems with use in water-sensitive formations, undesirably high viscosity, and challenges with being able to pre-hydrate the clays. It has surprisingly been discovered that a clay-free, water-based drilling fluid can include a first viscosifier consisting of a cross-linked starch and a second viscosifier consisting of a polyacrylamide or polyacrylamide derivative. The viscosifiers were unexpectedly discovered to perform as well or better than xanthan gum. Moreover, it was unexpectedly discovered that a synergistic effect occurred whereby the combination of the two viscosifiers performed substantially better than either of the viscosifiers alone.

According to any of the embodiments, a drilling fluid can include a base fluid comprising water; a first viscosifier consisting of a cross-linked starch; and a second viscosifier consisting of a cross-linked acrylamide-based polymer, wherein the first viscosifier and the second viscosifier create a synergistic effect whereby a first test drilling fluid consisting of the base fluid, the first viscosifier, and the second viscosifier in the same concentrations as the drilling fluid has a yield point in the range of 17 to 30 lb/100 ft² (7.2 to 14.4 Pa) and a 10-minute gel strength greater than or equal to 8 lb/100 ft² after hot rolling compared to a second test drilling fluid consisting of the base fluid and only the first viscosifier or the second viscosifier in a concentration equal to both the first and second viscosifier in the first test drilling fluid that has a yield point less than or equal to 17 lb/100 ft² (7.2 Pa) and a 10-minute gel strength less than 8 lb/100 ft² after hot rolling.

According to other embodiments, a method of drilling a wellbore in a subterranean formation can include introducing the drilling fluid into the subterranean formation.

The discussion of preferred embodiments regarding the drilling fluid, the viscosfiers, or any ingredient in the drilling fluid, is intended to apply to the composition embodiments and the method embodiments. Any reference to the unit "gallons" means U.S. gallons.

The drilling fluid includes a water-based base fluid. The base fluid can include dissolved materials or undissolved solids. The base fluid includes water. The water can be selected from the group consisting of freshwater, brine, seawater, brackish water, and combinations thereof. The drilling fluid can further include a water-soluble salt. The water-soluble salt can be selected from the group consisting of sodium chloride, calcium chloride, calcium bromide, potassium chloride, potassium bromide, magnesium chloride, and any combination thereof. The drilling fluid can include the water-soluble salt in a concentration in the range of about 5 to about 350 pounds per barrel (ppb) (19 to 1,353 kilograms per cubic meter "kg/m³") of the water.

The drilling fluid includes a first viscosifier consisting of a cross-linked starch. Starch or amylum is a polymeric carbohydrate or a polysaccharide consisting of numerous glucose units joined by glycosidic bonds. A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. The number of repeating units of a polymer is referred to as the chain length of the polymer. The number of repeating units of a polymer can range from approximately 11 to greater than 10,000. In a copolymer, the repeating units from each of the monomer residues can be arranged in various ways along the polymer chain. For example, the repeating units can be random, alternating, periodic, or block. The conditions of the polymerization reaction can be adjusted to help control the average number of repeating units (the average chain length) of the polymer. As used herein, a "polymer" can include a cross-linked polymer. As used herein, a "cross link" or "cross linking" is a connection between two polymer molecules. A cross-link between two polymer molecules can be formed by a direct interaction between the polymer molecules, or conventionally, by using a cross-linking agent that reacts with the polymer molecules to link the polymer molecules.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight for a copolymer can be expressed as follows:

$$\text{Avg. molecular weight} = (M.W.m_1 * RU\, m_1) + (M.W.m_2 * RU\, m_2)\ldots$$

where $M\cdot W\cdot m_1$ is the molecular weight of the first monomer; $RU\, m_1$ is the number of repeating units of the first monomer; M·W·m$_2$ is the molecular weight of the second monomer; and RU m$_2$ is the number of repeating units of the second monomer. Of course, a terpolymer would include three monomers, a tetra polymer would include four monomers, and so on.

The starch can be selected from wheat, potato, rice, corn, tapioca, cassava, and roots containing starch. The starch is cross linked. The cross-linked starch can be formed by adding a cross-linking agent. The cross-linking agent can be selected from epichlorohydrin, phosphorus oxychloride, and molecules having at least two epoxide groups. The degree of cross linking can impact the viscosity of the drilling fluid. The starch can be crosslinked with the cross-linking agent, in a basic aqueous starch suspension, or slurry for example, at a temperature and for a period of time such that the Brabender viscosity of the suspension exceeds the maximum viscosity which can be obtained in the starch suspension and then drops to about 50% or less of the maximum viscosity, as determined experimentally. The maximum Brabender viscosity is typically reached at a very low cross-linking density and then drops with further cross linking, as the cross-linked system becomes increasingly dense. The viscosity will vary by the amount of crosslinking and the test conditions, i.e., temperature, concentrations, etc. The cross linking can be continued until the viscosity decreases to a value in the range of from about 35% to 5% of the maximum viscosity. When the desired viscosity is reached, the cross-linking reaction can be terminated.

The starch can be a modified starch. The starch can be modified to add charged groups onto the starch polymer. The charged groups can be for example a cationic group, which is a positively charged group. The starch can be chemically modified by adding an acid, for example, to the starch to add the charged groups. The number of charged groups that are added can vary and can be controlled via the concentration of the acid for example. Once the starch has been chemically modified, the chemically modified starch can then be cross linked with the cross linker.

The starch can have a molecular weight in a range of 300,000 to 40,000,000 Daltons. The cross-linked starch can be in a concentration in a range from 1 to 15 pounds per barrel (ppb) of the base fluid (3.9 to 58.0 kilograms per cubic meter "kg/m$^3$"). The type of starch selected, degree of cross linking, chemical modification, and concentration can be selected such that the drilling fluid has desirable properties (discussed below).

The drilling fluid also includes the second viscosifier consisting of a cross-linked acrylamide-based polymer. The cross-linked acrylamide-based polymer can be a polyacrylamide or a polyacrylamide derivative. As used herein, polyacrylamide and polyacrylamide derivatives refer to polyacrylamide as well as copolymers of acrylamide, sodium acrylate, other amides, or other acrylates. The cross-linked acrylamide-based polymer can be polyacrylamide or can be a copolymer formed from at least one acrylamide monomer and at least one monomer containing either a sulfonic acid (or salt), a carboxylic acid, a phosphonic acid group, or a vinyl amide group. The acrylamide monomer can be selected from the group consisting of unsubstituted acrylamide monomers, N-substituted acrylamides such as alkylacrylamides, N-methylol acrylamide, N-isopropyl acrylamide, diacetone-acrylamide, N-alkyl acrylamide (where alkyl is $C_1$ to $C_{14}$), N,N-dialkyl acrylamide (where alkyl is $C_1$ to $C_{14}$), N-cycloalkane acrylamides, related compounds, and combinations thereof. The acrylamide monomer can be acrylamide tertiary butyl sulfonic acid (ATBS). Co-monomers can include, but are not limited to, acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides or N-vinyllactams (such as N-vinylformamide, N-vinylacetamide, N-methyl-N-vinylacetamide, N-vinylpyrrolidone (NVP), and N-vinylcaprolactam), N-allylamides, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates, allyl sulfonates, vinylimidazole, allylimidazole, or diallyldimethylammonium chloride. The polyacrylamide can have an average molecular weight in a range of 250,000 to 10,000,000.

The acrylamide-based polymer is cross linked. The cross-linked acrylamide-based polymer can preferably be branched as opposed to straight chain. The cross-linked and branched acrylamide-based polymer can also include higher order copolymers and block copolymers such as terpolymers and quaternary polymers. The acrylamide-based polymer can be cross linked with a cross-linking agent. The cross-linking agent can be any molecules that have at least two olefinic bonds, and can be selected from the group consisting of divinyl ether, diallyl ether, vinyl or allyl ethers of polyglycols or polyols (such as pentaerythritol allyl ether (PAE), allyl sucrose, ethylene glycol divinyl ether, triethylene glycol divinyl ether, diethylene glycol divinyl ether, glycerol diallyl ether, and polyethylene glycol divinyl ether, propylene glycol divinyl ether, and trimethylolpropane diallyl ether), divinylbenzene, 1,3-divinylimidazolidin-2-one (also known as 1,3-divinylethyleneurea or divinylimidazolidone), divinyltetrahydropyrimidin-2(1H)-one, dienes (such as 1,7-octadiene and 1,9-decadiene), allyl amines (such as triallylamine and tetraallylethylene diamine), N-vinyl-3(E)-ethylidene pyrrolidone, ethylidene bis(N-vinylpyrrolidone), N,N'-methylenebisacrylamide, N,N'-methylenebismethacrylamide, N,N'-ethylenebisacrylamide, N,N'-(1,2-dihydroxyethylene)bisacrylamide, 1,4-diacryloylpiperazine, N,N-diallylacrylamide, and 1,3,5-triacryloylhexahydro-1,3,5-triazine, ethylene glycol di(meth)acrylate, propylene glycol di(meth)acrylate, diethylene glycol di(meth)acrylate, polyethylene glycol di(meth)acrylate, 1,4-butanediol di(meth)acrylate, 1,6-hexanediol di(meth)acrylate, 1,1,1-trimethylolpropane trimethacrylate, pentaerythritol tri(meth)acrylate, pentaerythritol tetra(meth)acrylate, glycerol di(meth)acrylate, glycerol tri(meth)acrylate, triglycerol di(meth)acrylate, allyl (meth)acrylate, vinyl (meth)acrylate, or tris[2-(acryloyloxy)ethyl]isocyanurate. Examples of ester-based and amide-based crosslinkers that may be suitable in certain embodiments include, but are not limited to, vinyl or allyl esters (such as diallyl carbonate, divinyl adepate, divinyl sebacate, diallyl phthalate, diallyl maleate, diallyl succinate), 1,3,5-triallyl-1,3-5-triazine-2,4,6(1H,3H,5H)-trione, and triallyl cyanurate, and combinations thereof. The weight percentage of intermolecular crosslinking can range from 0.25% to 20%, 0.5% to 10%, or 0.75% to 5%.

The acrylamide-based polymer can include hydrophobic monomers, such as alkyl acrylate and methacrylate (where alkyl is $C_4$ to $C_{18}$), N-alkyl acrylamide and methacrylamide (where alkyl is $C_4$ to $C_{18}$), N,N-dialkyl acrylamide and methacrylamide (where alkyl is $C_4$ to $C_{18}$), styrene, 4-methylstyrene, alkenes, or vinyl ethers. The polymerization reaction can be controlled to provide a desired percentage of hydrophobic monomers. The desired percentage can range from 0.1% to 15 weight %.

The second viscosifier can be in a concentration in a range of 2 to 10 ppb (7.7 to 38.7 kg/m$^3$). For the second viscosifier, the monomers selected, degree of cross linking, molecular weight, degree of hydrophobicity, and concentration can be selected to provide desirable properties to the drilling fluid.

According to any of the embodiments, the drilling fluid is substantially clay free (i.e., less than 0.5 ppb is clay) or does not include a clay. Examples of clays that can be excluded from the drilling fluid include hectorite, bentonite, attapulgite, or sepiolite.

The first viscosifier and the second viscosifier create a synergistic effect whereby a first test drilling fluid consisting of the base fluid, the first viscosifier, and the second viscosifier in the same concentrations as the drilling fluid has a yield point in the range of 17 to 30 lb/100 ft$^2$ (7.2 to 14.4 Pa) and a 10-minute gel strength greater than or equal to 8 lb/100 ft$^2$ after hot rolling compared to a second test drilling fluid consisting of the base fluid and only the first viscosifier or the second viscosifier in a concentration equal to both the first and second viscosifier in the first test drilling fluid that has a yield point less than or equal to 17 lb/100 ft$^2$ (7.2 Pa) and a 10-minute gel strength less than 8 lb/100 ft$^2$ after hot rolling. It is to be understood that while the drilling fluid can contain other ingredients, it is the first and second viscosifiers that are primarily or wholly responsible for providing the requisite properties. For example, a "first test fluid" that is identical to the drilling fluid can have the stated yield point. Therefore, it is not necessary for the drilling fluid to include other additives to achieve the desired yield point. It is also to be understood that any discussion related to a "test fluid" is included for purposes of demonstrating that while the drilling fluid being introduced into a wellbore may contain other ingredients, it is the first and second viscosifiers that provide the desired yield point or other properties. Therefore, while it may not be possible to perform a test in a wellbore for the specific drilling fluid being introduced, one can formulate a test fluid to be tested in a laboratory to identify if the ingredients and concentration of the ingredients will provide the desired yield point or properties. It is also to be understood that it is the first and second viscosifiers that create a synergistic effect. Accordingly, the second test fluid that includes only one of the viscosifiers—namely either the first viscosifier or the second viscosifier—will not possess the desired yield point or other properties. It is also to be understood that any subsequent discussion regarding desired properties of "the drilling fluid" also applies to the "first test fluid" without the need to refer to both fluids throughout. By way of example, if the discussion relates to the drilling fluid having a specific rheology reading, plastic viscosity, etc., then the first test fluid can also have the specific rheology reading, plastic viscosity, etc. without having to list the same properties for the first test fluid in addition to the drilling fluid.

The drilling fluid can have desirable properties. The properties of the drilling fluid can be sufficient such that the drilling fluid effectively suspends and carries drill cutting through the annulus of the well to the surface but also remains pumpable. According to any of the embodiments, the drilling fluid has 3- and 6-rpm rheology readings in a range from 5 to 15 after hot rolling. 3- and 6-rpm readings above 5 can be indicative of the low shear suspending capability and carrying capacity of drill cuttings by the drilling fluid. However, 3- and 6-rpm rheology readings above 18 can render the drilling fluid too viscous to pump into the subterranean formation. The Tau zero can also be used to determine the suspending capability and carrying capacity of the drilling fluid at low shear rates. According to any of the embodiments, the drilling fluid has a Tau zero in a range from 4 to 10 lb/100 ft$^2$.

The drilling fluid can be pumpable. According to any of the embodiments, the drilling fluid has 300- and 600-rpm readings in a range from 25 to 120. The 600-rpm reading can be in a range of 50 to 120. According to any of the embodiments, the 300-rpm reading is less than the 600-rpm reading. 300- and 600-rpm readings above 140 can render the drilling fluid too viscous at high shear rates to be pumpable. Conversely, 300- and 600-rpm readings below 30 can indicate the fluid will likely not adequately suspend cuttings or weighting agents. The drilling fluid can have a rheological profile such that the 3- and 6-rpm rheology readings are high enough to suspend and carry the drill cuttings, but the 300- and 600-rpm readings are low enough such that the drilling fluid is pumpable. Some viscosifiers may have adequate 3- and 6-rpm rheology readings but have too high of the 300- and 600-rpm readings. Likewise, some viscosifiers may provide acceptable 300- and 600-rpm readings but have 3- and 6-rpm readings as well as Tau 0 values that are too low. Accordingly, the rheological profile should be balanced with both of these desirable properties in mind.

According to any of the embodiments, the drilling fluid has a plastic viscosity (PV) in a range of 12 to 50 centipoise (cP) after hot rolling. The drilling fluid can have a yield point (YP) in a range of 17 to 30 lb/100 ft$^2$ (7.2 to 14.4 Pa) after hot rolling. The drilling fluid can have a 10-second gel strength in a range of 3 to 10 lb/100 ft$^2$ and a 10-minute gel strength in a range of 8 to 15 lb/100 ft$^2$ after hot rolling. According to any of the embodiments, the drilling fluid is thermally stable up to or above a temperature of 225° F. (107.2° C.) or higher. The first and second viscosifiers can be selected such that the drilling fluid is thermally stable up to the specified temperature. As used herein, "thermally stable" means that the drilling fluid does not lose its desirable properties of being able to suspend and carry drill cuttings and remains pumpable or that the first and second viscosifiers do not degrade or become chemically altered to the point that the drilling fluid loses its desirable properties. As mentioned above, some alternative viscosifiers to xanthan gum may have desirable properties but are not thermally stable, which prevents their use in high-temperature wellbores.

The drilling fluid can include other ingredients. The other ingredients can include without limitation a base (e.g., sodium hydroxide or potassium hydroxide), a fluid loss additive, a weighting agent, a suspension aid, or an oxygen or hydrogen sulfide scavenger. According to any of the embodiments, the drilling fluid has an API fluid loss of less than 10 mL/30 minutes. The drilling fluid can have a desirable density in a range of 8 to 21 ppg (0.959 to 2.516 kg/L).

The methods include the step of introducing the drilling fluid into a subterranean formation during a drilling operation. The drilling operation can form a wellbore within the subterranean formation. The step of introducing the drilling fluid can be for the purpose of drilling the wellbore. The drilling fluid can be in a pumpable state before and during introduction into the formation. The drilling operation can involve trenchless directional drilling, wherein the drilling fluid can be used in horizontal directional drilling, guided boring, auger boring, pipe jacking, micro-tunneling, and river crossing.

An embodiment of the present disclosure is a drilling fluid comprising: a base fluid comprising water; a first viscosifier consisting of a cross-linked starch; and a second viscosifier consisting of a cross-linked acrylamide-based polymer, wherein the first viscosifier and the second viscosifier create a synergistic effect whereby a first test drilling fluid consisting of the base fluid, the first viscosifier, and the second viscosifier in the same concentrations as the drilling fluid has a yield point in the range of 17 to 30 lb/100 ft$^2$ (7.2 to 14.4 Pa) and a 10-minute gel strength greater than or equal to 8 lb/100 ft$^2$ after hot rolling compared to a second test drilling fluid consisting of the base fluid and only the first viscosifier or the second viscosifier in a concentration equal to both the first and second viscosifier in the first test drilling fluid that has a yield point less than or equal to 17 lb/100 ft$^2$ (7.2 Pa) and a 10-minute gel strength less than 8 lb/100 ft$^2$ after hot rolling. Optionally, the cross-linked starch is selected from the group consisting of wheat, potato, rice, corn, tapioca, cassava, roots containing starch, and combinations thereof. Optionally, the cross-linked starch is cross linked with a cross-linking agent, and wherein the cross-linking agent is selected from epichlorohydrin, phosphorus oxychloride, or molecules having at least two epoxide groups. Optionally, the cross-linked starch is a modified starch, and wherein modification of the starch adds one or more charged groups onto the starch. Optionally, the one or more charged groups are cationic groups. Optionally, the cross-linked starch has a molecular weight in a range of 300,000 to 40,000,000. Optionally, the first viscosifier is in a concentration in a range from 1 to 15 ppb of the base fluid (3.9 to 58 kg/m$^3$). Optionally, the cross-linked acrylamide-based polymer is a copolymer formed from at least one acrylamide monomer and at least one monomer containing either a sulfonic acid or sulfonic acid salt, a carboxylic acid, a phosphonic acid group, or a vinyl amide group. Optionally, the acrylamide monomer is selected from the group consisting of unsubstituted acrylamide monomers, N-substituted acrylamides, N-methylol acrylamide, N-isopropyl acrylamide, diacetoneacrylamide, N-alkyl acrylamide (where alkyl is C1 to C14), N,N-dialkyl acrylamides (where alkyl is C1 to C14), N-cycloalkane acrylamides, acrylamide tertiary butyl sulfonic acid (ATBS), related compounds, and combinations thereof. Optionally, co-monomers are selected from the group consisting of acrylates, methacrylates, acrylic acid, methacrylic acid, N-vinylamides, N-vinyllactams, N-allylamides, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, and combinations thereof. Optionally, the cross-linked acrylamide-based polymer has an average molecular weight in a range of 250,000 to 10,000,000. Optionally, the cross-linked acrylamide-based polymer is branched. Optionally, the cross-linked acrylamide-based polymer is cross linked with a cross-linking agent, and wherein the cross-linking agent is a molecule having at least two olefinic bonds. Optionally, a percentage of intermolecular crosslinking ranges from 0.25% to 20%. Optionally, the cross-linked acrylamide-based polymer further comprises hydrophobic monomers selected from alkyl acrylate and methacrylate (where alkyl is C4 to C18), N-alkyl acrylamide and methacrylamide (where alkyl is C4 to C18), N,N-dialkyl acrylamide and methacrylamide (where alkyl is C2 to C18), styrene, 4-methylstyrene, alkenes, or vinyl ethers. Optionally, the second viscosifier is in a concentration in a range of 2 to 10 ppb of the base fluid (7.7 to 38.7 kg/m$^3$). Optionally, less than 0.5 ppb of the drilling fluid is a clay. Optionally, the drilling fluid has 300- and 600-rpm readings in a range from 25 to 120 lb/100 ft$^2$. Optionally, the drilling fluid has a plastic viscosity in a range of 12 to 50 centipoise (cP) after hot rolling; a yield point in a range of 15 to 30 lb/100 ft$^2$ (7.2 to 14.4 Pa) after hot rolling; a 10-second gel strength in a range of 3 to 10 lb/100 ft$^2$ and a 10-minute gel strength in a range of 7 to 15 lb/100 ft$^2$ after hot rolling.

Another embodiment of the present disclosure is a method of drilling a wellbore in a subterranean formation comprising: introducing a drilling fluid into the subterranean formation, wherein the drilling fluid comprises: a base fluid comprising water; a first viscosifier consisting of a cross-linked starch; and a second viscosifier consisting of a cross-linked acrylamide-based polymer, wherein the first viscosifier and the second viscosifier create a synergistic effect whereby a first test drilling fluid consisting of the base fluid, the first viscosifier, and the second viscosifier in the same concentrations as the drilling fluid has a yield point in the range of 17 to 30 lb/100 ft$^2$ (7.2 to 14.4 Pa) and a 10-minute gel strength greater than or equal to 8 lb/100 ft$^2$ after hot rolling compared to a second test drilling fluid consisting of the base fluid and only the first viscosifier or the second viscosifier in a concentration equal to both the first and second viscosifier in the first test drilling fluid that has a yield point less than or equal to 17 lb/100 ft$^2$ (7.2 Pa) and a 10-minute gel strength less than 8 lb/100 ft$^2$ after hot rolling. Optionally, the cross-linked starch is selected from the group consisting of wheat, potato, rice, corn, tapioca, cassava, roots containing starch, and combinations thereof. Optionally, the cross-linked starch is cross linked with a cross-linking agent, and wherein the cross-linking agent is selected from epichlorohydrin, phosphorus oxychloride, or molecules having at least two epoxide groups. Optionally, the cross-linked starch is a modified starch, and wherein modification of the starch adds one or more charged groups onto the starch. Optionally, the one or more charged groups are cationic groups. Optionally, the cross-linked starch has a molecular weight in a range of 300,000 to 40,000,000. Optionally, the first viscosifier is in a concentration in a range from 1 to 15 ppb of the base fluid (3.9 to 58 kg/m$^3$). Optionally, the cross-linked acrylamide-based polymer is a copolymer formed from at least one acrylamide monomer and at least one monomer containing either a sulfonic acid or sulfonic acid salt, a carboxylic acid, a phosphonic acid group, or a vinyl amide group. Optionally, the acrylamide monomer is selected from the group consisting of unsubstituted acrylamide monomers, N-substituted acrylamides, N-methylol acrylamide, N-isopropyl acrylamide, diacetoneacrylamide, N-alkyl acrylamide (where alkyl is C1 to C14), N,N-dialkyl acrylamides (where alkyl is C1 to C14), N-cycloalkane acrylamides, acrylamide tertiary butyl sulfonic acid (ATBS), related compounds, and combinations thereof. Optionally, co-monomers are selected from the group consisting of acrylates, methacrylates, acrylic acid, methacrylic acid, N-vinylamides, N-vinyllactams, N-allylamides, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, and combinations thereof. Optionally, the cross-linked acrylamide-based polymer has an average molecular weight in a range of 250,000 to 10,000,000. Optionally, the cross-linked acrylamide-based polymer is branched. Optionally, the cross-linked acrylamide-based polymer is cross linked with a cross-linking agent, and wherein the cross-linking agent is a molecule having at least two olefinic bonds. Optionally, a percentage of intermolecular crosslinking ranges from 0.25% to 20%. Optionally, the cross-linked acrylamide-based polymer further comprises hydrophobic monomers selected from alkyl acrylate and methacrylate (where alkyl is C4 to C18), N-alkyl acrylamide and methacrylamide (where alkyl is C4 to C18), N,N-dialkyl acrylamide and methacrylamide (where alkyl is C2 to C18), styrene, 4-methylstyrene, alkenes, or vinyl ethers. Optionally, the second viscosifier is in a concentration in a range of 2 to 10 ppb of the base fluid (7.7 to 38.7 kg/m$^3$). Optionally, less than 0.5 ppb of the drilling fluid is a clay. Optionally, the drilling fluid has 300- and 600-rpm readings in a range from 25 to 120 lb/100 ft$^2$. Optionally, the drilling fluid has a plastic viscosity in a range of 12 to 50 centipoise (cP) after hot rolling; a yield point in a range of 15 to 30 lb/100 ft$^2$ (7.2 to 14.4 Pa) after hot rolling; a 10-second gel strength in a range of 3 to 10 lb/100 ft$^2$ and a 10-minute gel strength in a range of 7 to 15 lb/100 ft$^2$ after hot rolling.

The exemplary treatment fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. It should also be noted that while FIG. 1 and the discussion of the FIGURE is for a drilling operation and fluid, other types of treatment fluids, such as spacer fluids, workover fluids, and stimulation fluids can be used with the disclosed equipment.

Figure 1:
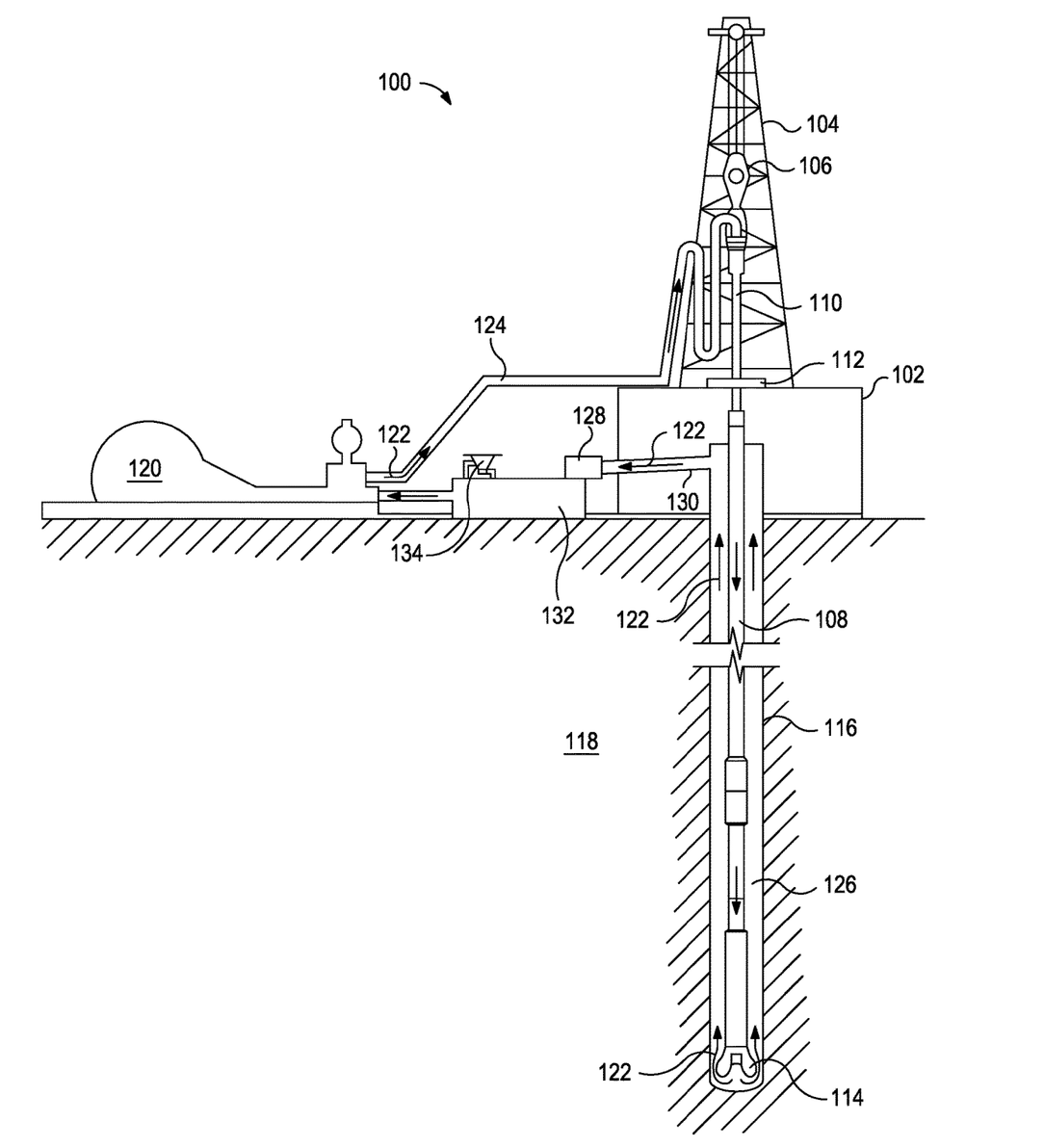
FIG. 1 illustrates a system for introducing a treatment fluid into a subterranean formation.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more additional fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the additional fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the disclosed fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the various embodiments, the following examples are given. The testing was performed by the methods for each test as outlined above before hot rolling (BHR) and after hot rolling (AHR).

Table 1 lists the ingredients and concentrations of ingredients in pounds per barrel (ppb) and the data. PA #1 is a crosslinked ATBS-NVP copolymer viscosifier/suspension aid; EZ MUD® DP viscosifier additive is a partially hydrolyzed straight chain acrylamide/sodium acrylate copolymer viscosifier/suspension aid having a MW greater than 10,000,000 Da; Starch #1 is a cross-linked starch derivative fluid loss control additive; DEXTRID® E is a non-crosslinked modified starch fluid loss control additive; PAC™-L is a modified natural cellulosic polymer filtration control additive; TAU-MOD™ is a fibrous amorphous viscosifier for use in clay-free fluids.

PA #1 was used, as seen for Fluid 2, then the low-end rheology decreased and the high-end rheology (e.g., 300- and 600-rpm readings) increased, both of which were undesirable results because that indicated poor drill cutting suspending capability and inadequate pumpability. When only Starch #1 was used (Fluid 3), the overall rheology decreased, which is also undesirable. When a straight chain polyacrylamide derivative (EZ MUD® DP—Fluid 4) was substituted in for the cross-linked modified polyacrylamide derivative (PA #1—Fluid 1), the low-end rheology was very low, which indicates poor suspending capability. A similar result was observed when a non-crosslinked starch (DEXTRID E®—Fluid 5) was substituted for Starch #1 (Fluid 1).

TABLE 1

|  | Fluid 1 | Fluid 2 | Fluid 3 | Fluid 4 | Fluid 5 |
|---|---|---|---|---|---|
| Water | 320 | 320 | 320 | 320 | 320 |
| NaCl | 31.5 | 31.5 | 31.5 | 31.5 | 31.5 |
| PA #1 | 2.5 | 9 | — | — | 2.5 |
| EZ MUD ® DP | — | — | — | 2.5 | — |
| Starch #1 | 6.5 | — | 9 | 6.5 | — |
| DEXTRID ® E | — | — | — | — | 6.5 |
| NaOH | 0.15 | 0.15 | 0.15 | 0.15 | 0.15 |
| PAC ™-L | 2 | 2 | 2 | 2 | 2 |
| Weighting Agent | 85 | 85 | 85 | 85 | 85 |
| TAU-MOD ™ | 2 | 2 | 2 | 2 | 2 |
| Oxygen Scavenger | 0.5 | 0.5 | 0.5 | 0.5 | 0.5 |

| Rheology at 120° F., Fann 45 | | | | | | | | | | |
|---|---|---|---|---|---|---|---|---|---|---|
|  | BHR | AHR | BHR | AHR | BHR | AHR | BHR | AHR | BHR | AHR |
| 600 | 61 | 46 | 85 | 55 | 47 | 26 | 121 | 34 | 39 | 17 |
| 300 | 34 | 32 | 53 | 36 | 25 | 16 | 86 | 19 | 20 | 10 |
| 200 | 24 | 25 | 40 | 28 | 17 | 12 | 69 | 13 | 13 | 6 |
| 100 | 14 | 19 | 26 | 19 | 9 | 8 | 46 | 8 | 8 | 4 |
| 6 | 2 | 8 | 6 | 6 | 0 | 2 | 7 | 1 | 1 | 1 |
| 3 | 1 | 7 | 5 | 6 | 0 | 1 | 4 | 1 | 1 | 0 |
| PV (cP) | 27 | 14 | 31 | 19 | 22 | 9 | 36 | 15 | 19 | 8 |
| YP (lb/100 ft$^2$) | 7 | 17 | 22 | 17 | 3 | 7 | 50 | 4 | 2 | 2 |
| 10 s gel (lb/100 ft$^2$) | 2 | 9 | 5 | 5 | 0 | 1 | 4 | 0 | 0 | 0 |
| 10 min gel (lb/100 ft$^2$) | 2 | 12 | 6 | 7 | 0 | 1 | 5 | 0 | 1 | 1 |
| API fluid loss (mL/30 min) | 2.8 | | 3.6 | | 3.2 | | 3.5 | | 2.5 | |

As can be seen in Table 1, desirable low-end rheology AHR (e.g., 3- and 6-rpm readings) can be observed when both PA #1 and Starch #1 are present (Fluid 1). When only Table 2 lists the ingredients and concentrations of ingredients in ppb and the data to compare a different cross-linked starch (Starch #2) as a viscosifier.

TABLE 2

|  | Fluid 6 | Fluid 7 | Fluid 8 | Fluid 9 | Fluid 10 |
|---|---|---|---|---|---|
| Water | 320 | 320 | 320 | 320 | 320 |
| NaCl | 31.5 | 31.5 | 31.5 | 31.5 | 31.5 |
| PA #1 | 4 | 8 | — | — | 4 |
| EZ MUD ® DP | — | — | — | 4 | — |
| Starch #1 | 4 | — | 8 | 4 | — |
| DEXTRID ® E | — | — | — | — | 4 |
| NaOH | 0.15 | 0.15 | 0.15 | 0.15 | 0.15 |
| PAC ™-L | 2 | 2 | 2 | 2 | 2 |
| Weighting Agent | 85 | 85 | 85 | 85 | 85 |
| TAU-MOD ™ | 2 | 2 | 2 | 2 | 2 |
| Oxygen Scavenger | 0.5 | 0.5 | 0.5 | 0.5 | 0.5 |

| Rheology at 120° F., Fann 45 | | | | | | | | | | |
|---|---|---|---|---|---|---|---|---|---|---|
|  | BHR | AHR | BHR | AHR | BHR | AHR | BHR | AHR | BHR | AHR |
| 600 | 62 | 47 | 73 | 48 | 43 | 24 | 133 | 28 | 42 | 22 |
| 300 | 36 | 29 | 46 | 29 | 24 | 14 | 98 | 14 | 23 | 12 |

TABLE 2-continued

| 200 | 26 | 23 | 34 | 22 | 16 | 10 | 83 | 10 | 16 | 8 |
|---|---|---|---|---|---|---|---|---|---|---|
| 100 | 15 | 16 | 21 | 14 | 9 | 6 | 62 | 5 | 9 | 5 |
| 6 | 2 | 6 | 5 | 4 | 0 | 1 | 15 | 0 | 1 | 1 |
| 3 | 2 | 6 | 4 | 4 | 0 | 1 | 9 | 0 | 1 | 1 |
| PV (cP) | 26 | 17 | 28 | 19 | 19 | 10 | 35 | 14 | 20 | 10 |
| YP (lb/100 ft$^2$) | 10 | 12 | 18 | 10 | 4 | 5 | 64 | 0 | 3 | 2 |
| 10 s gel (lb/100 ft$^2$) | 2 | 8 | 4 | 4 | 0 | 0 | 9 | 0 | 1 | 1 |
| 10 min gel (lb/100 ft$^2$) | 3 | 9 | 5 | 6 | 0 | 0 | 11 | 0 | 1 | 2 |
| API fluid loss (mL/30 min) | 2.6 | | 3.5 | | 2.6 | | 2.3 | | 2.5 | |

As can be seen in Table 2, a desirable low-end rheology AHR can be observed when both PA #1 and Starch #2 were present (Fluid 6). When only PA #1 was used, as in Fluid 7, the rheology was similar, but the API fluid loss increased. Additionally, due to the higher cost of PA #1 compared to Starch #2, this fluid would cost more to produce. When only Starch #2 was used (Fluid 8), the overall rheology decreased, which is undesirable. When the straight chain polyacrylamide derivative (EZ MUD® DP—Fluid 9) was substituted in for the cross-linked modified polyacrylamide derivative (Fluid 6), the low-end rheology was very low. A similar result was observed when a non-crosslinked starch (DEXTRID® E—Fluid 10) was substituted for the cross-linked Starch #2 (Fluid 6). This indicates that none of the additives alone, or in combination, provided desirable properties to the fluids, but the combination of cross-linked polyacrylamide derivatives and cross-linked starch (Fluids 1 and 6) showed synergistic effect that provided desirable properties to the fluids.

Table 3 lists the ingredients and concentrations of ingredients in ppb and the data to evaluate the effectiveness of a first viscosifier and a second viscosifier against xanthan gum. Starch #1 and #2 were used as the first viscosifier. Starch #1 is a cross-linked corn starch with epichloride as the cross-linking agent. Starch #2 is believed to be a cross-linked potato or corn starch. PA #1, PA #2, and PA #3 were used as the second viscosifier. PA #1 is a cross-linked anionic polyacrylamide derivative copolymer of acrylamide tertiary butyl sulfonic acid (ATBS) and N-vinyl pyrrolidone monomer. PA #2 and PA #3 are believed to be cross-linked acrylamide/ATBS/NVP copolymers. The differences between PA #2 and #3 may be the degree of hydrophobicity, degree of cross linking, or molecular weight.

TABLE 3

| | Fluid 11 | | Fluid 12 | | Fluid 13 | | Fluid 14 | | Fluid 15 | | Fluid 16 | |
|---|---|---|---|---|---|---|---|---|---|---|---|---|
| Water | 320 | | 320 | | 320 | | 320 | | 320 | | 320 | |
| NaCl | 31.5 | | 31.5 | | 31.5 | | 31.5 | | 31.5 | | 31.5 | |
| Bentonite clay | — | | — | | 5 | | — | | — | | — | |
| PA #1 | — | | 2.5 | | — | | — | | — | | — | |
| PA #2 | 2.5 | | — | | — | | — | | — | | — | |
| PA #3 | — | | — | | — | | — | | 3.5 | | 3.5 | |
| Starch #1 | — | | 6.5 | | — | | — | | — | | — | |
| Starch #2 | 4 | | — | | — | | 4 | | 4 | | — | |
| NaOH | 0.15 | | 0.15 | | — | | 0.15 | | 0.15 | | 0.15 | |
| KOH | — | | — | | 0.5 | | — | | — | | — | |
| FLA | 2 | | 2 | | 2 | | 2 | | 2 | | 2 | |
| Polyacrylamide | — | | — | | 1 | | — | | — | | — | |
| Weighting agent | 85 | | 85 | | 85 | | 85 | | 85 | | 85 | |
| Xanthan gum | — | | — | | 1.5 | | — | | — | | — | |
| Suspension aid | 2 | | 2 | | — | | 2 | | 2 | | 2 | |
| O$_2$ scavenger | 0.5 | | 0.5 | | — | | 0.5 | | 0.5 | | 0.5 | |
| | BHR | AHR | BHR | AHR | BHR | AHR | BHR | AHR | BHR | AHR | BHR | AHR |
| 600 | 79 | 53 | 61 | 46 | 92 | 60 | 27 | 19 | 106 | 64 | 51 | 21 |
| 300 | 46 | 35 | 34 | 32 | 70 | 45 | 13 | 11 | 70 | 42 | 28 | 12 |
| 200 | 33 | 27 | 24 | 25 | 59 | 34 | 9 | 7 | 52 | 30 | 20 | 9 |
| 100 | 19 | 19 | 14 | 19 | 44 | 25 | 5 | 4 | 32 | 19 | 12 | 5 |
| 6 | 3 | 7 | 2 | 8 | 13 | 6 | 0 | 1 | 7 | 5 | 3 | 1 |
| 3 | 2 | 6 | 1 | 7 | 10 | 6 | 0 | 1 | 6 | 4 | 2 | 1 |
| PV (cP) | 32 | 18 | 27 | 14 | 22 | 15 | 14 | 8 | 37 | 22 | 23 | 10 |
| YP (lb/100 ft$^2$) | 14 | 17 | 7 | 17 | 48 | 30 | 0 | 3 | 33 | 20 | 5 | 2 |
| 10 s gel | 2 | 7 | 2 | 9 | 11 | 7 | 0 | 1 | 7 | 4 | 3 | 1 |
| 10 min gel | 7 | 11 | 2 | 12 | 16 | 9 | 0 | 1 | 11 | 8 | 5 | 1 |
| API fluid loss | 2.8 | | 2.8 | | 3.3 | | 3.5 | | 2.7 | | 4 | |

As can be seen in Table 3, Fluid #13 containing xanthan gum as a standard by which to compare alternative viscosifiers exhibited a good rheological profile and other properties. As can also be seen in Fluids #11, 12, and 15 that included different polyacrylamides as the second viscosifier and different cross-linked starches as the first viscosifier exhibited comparable or better properties compared to Fluid #13 of xanthan gum. It was initially thought that Fluids #11, 12, and 15 would have 300- and 600-rpm rheological readings that would be too high and thus render these fluids too viscous to pump. However, it was unexpectedly discovered that the 300- and 600-rpm readings AHR were low enough that the fluids were pumpable with Fluids #11 and 12 having readings less than the xanthan gum fluid and only slightly higher than the xanthan gum for Fluid #15.

Moreover, the unexpected synergistic effect of combining the first and second viscosifiers can clearly be seen when comparing Fluid #15 containing both viscosifiers against Fluid #14 that only included starch #2 and against Fluid #16 that only included the PA #3. As can be seen, neither Fluid #14 nor Fluid #16 exhibited sufficient 3- and 6-rpm rheology readings, PV, YP, or gel strength to be able to suspend and carry drill cuttings within those fluids. Whereas, by combining both PA #3 and starch #2 together in Fluid #15, the 3- and 6-rpm rheology readings, PV, YP, and gel strengths all increased substantially to a desired value, which clearly demonstrates the synergistic effect and shows that this fluid is capable of suspending and carrying drill cuttings while still being in a pumpable state. The data clearly show that not only can the type of polyacrylamide and starch be varied while still possessing desirable properties, but also show that the combination of the polyacrylamide and starch create a synergistic effect thereby making such a combination an excellent alternative to xanthan gum or other viscosifiers.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more viscosifiers, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A drilling fluid comprising:
   a base fluid comprising water;
   a first viscosifier consisting of a pre-cross-linked starch; and
   a second viscosifier consisting of a pre-cross-linked acrylamide-based polymer,
   wherein the first viscosifier and the second viscosifier create a synergistic effect whereby a first test drilling fluid consisting of the base fluid, the first viscosifier, and the second viscosifier in the same concentrations as the drilling fluid has a yield point in the range of 17 to 30 lb/100 ft$^2$ (7.2 to 14.4 Pa) and a 10-minute gel strength greater than or equal to 8 lb/100 ft$^2$ after hot rolling compared to a second test drilling fluid consisting of the base fluid and only the first viscosifier or the second viscosifier in a concentration equal to both the first and second viscosifier in the first test drilling fluid that has a yield point less than or equal to 17 lb/100 ft$^2$ (7.2 Pa) and a 10-minute gel strength less than 8 lb/100 ft$^2$ after hot rolling,
   wherein the drilling fluid does not comprise a clay, and
   wherein the drilling fluid is pumpable.

2. The drilling fluid according to claim 1, wherein the pre-cross-linked starch is selected from the group consisting of wheat, potato, rice, corn, tapioca, cassava, roots containing starch, and combinations thereof.

3. The drilling fluid according to claim 2, wherein the pre-cross-linked starch is cross linked with a cross-linking agent, and wherein the cross-linking agent is selected from epichlorohydrin, phosphorus oxychloride, or molecules having at least two epoxide groups.

4. The drilling fluid according to claim 1, wherein the pre-cross-linked starch is a modified starch, and wherein modification of the starch adds one or more charged groups onto the starch.

5. The drilling fluid according to claim 4, wherein the one or more charged groups are cationic groups.

6. The drilling fluid according to claim 1, wherein the pre-cross-linked starch has a molecular weight in a range of 300,000 to 40,000,000.

7. The drilling fluid according to claim 1, wherein the first viscosifier is in a concentration in a range from 1 to 15 ppb of the base fluid (3.9 to 58 kg/m$^3$).

8. The drilling fluid according to claim 1, wherein the pre-cross-linked acrylamide-based polymer is polyacrylamide or a copolymer formed from at least one acrylamide monomer and at least one co-monomer containing either a sulfonic acid or sulfonic acid salt, a carboxylic acid, a phosphonic acid group, or a vinyl amide group.

9. The drilling fluid according to claim 8, wherein the acrylamide monomer is selected from the group consisting of unsubstituted acrylamide monomers, N-substituted acrylamides, N-methylol acrylamide, N-isopropyl acrylamide, diacetone-acrylamide, N-alkyl acrylamide, N,N-dialkyl acrylamides, N-cycloalkane acrylamides, acrylamide tertiary butyl sulfonic acid, wherein the alkyl has a carbon chain length in a range of $C_1$ to $C_{14}$, related compounds, and combinations thereof.

10. The drilling fluid according to claim 8, wherein the co-monomers are selected from the group consisting of acrylates, methacrylates, acrylic acid, methacrylic acid, N-vinylamides, N-vinyllactams, N-allylamides, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, and combinations thereof.

11. The drilling fluid according to claim 1, wherein the pre-cross-linked acrylamide-based polymer has an average molecular weight in a range of 250,000 to 10,000,000.

12. The drilling fluid according to claim 1, wherein the pre-cross-linked acrylamide-based polymer is branched.

13. The drilling fluid according to claim 12, wherein the pre-cross-linked acrylamide-based polymer is cross linked with a cross-linking agent, and wherein the cross-linking agent is a molecule having at least two olefinic bonds.

14. The drilling fluid according to claim 12, wherein a percentage of intermolecular crosslinking ranges from 0.25% to 20%.

15. The drilling fluid according to claim 1, wherein the pre-cross-linked acrylamide-based polymer further comprises hydrophobic monomers selected from alkyl acrylate and methacrylate wherein the alkyl has a carbon chain length in a range of $C_4$ to $C_{18}$, N-alkyl acrylamide and methacrylamide wherein the alkyl has a carbon chain length in a range of $C_4$ to $C_{18}$, N,N-dialkyl acrylamide and methacrylamide wherein the alkyl has a carbon chain length in a range of $C_2$ to $C_{18}$, styrene, 4-methylstyrene, alkenes, or vinyl ethers.

16. The drilling fluid according to claim 1, wherein the second viscosifier is in a concentration in a range of 2 to 10 ppb of the base fluid (7.7 to 38.7 kg/m³).

17. The drilling fluid according to claim 1, wherein the drilling fluid has 300-rpm and 600-rpm readings in a range from 25 to 120 lb/100 ft².

18. The drilling fluid according to claim 1, wherein the drilling fluid has a plastic viscosity in a range of 12 to 50 centipoise (cP) after hot rolling; a yield point in a range of 17 to 30 lb/100 ft² (7.2 to 14.4 Pa) after hot rolling; a 10-second gel strength in a range of 3 to 10 lb/100 ft² and a 10-minute gel strength in a range of 8 to 15 lb/100 ft² after hot rolling.

19. A method of drilling a wellbore in a subterranean formation comprising:
introducing a drilling fluid into the subterranean formation, wherein the drilling fluid comprises:
a base fluid comprising water;
a first viscosifier consisting of a cross-linked starch; and
a second viscosifier consisting of a cross-linked acrylamide-based polymer,
wherein the first viscosifier and the second viscosifier are cross-linked prior to introduction of the drilling fluid into the subterranean formation,
wherein the first viscosifier and the second viscosifier create a synergistic effect whereby a first test drilling fluid consisting of the base fluid, the first viscosifier, and the second viscosifier in the same concentrations as the drilling fluid has a yield point in the range of 17 to 30 lb/100 ft² (7.2 to 14.4 Pa) and a 10-minute gel strength greater than or equal to 8 lb/100 ft² after hot rolling compared to a second test drilling fluid consisting of the base fluid and only the first viscosifier or the second viscosifier in a concentration equal to both the first and second viscosifier in the first test drilling fluid that has a yield point less than or equal to 17 lb/100 ft² (7.2 Pa) and a 10-minute gel strength less than 8 lb/100 ft² after hot rolling,
wherein the drilling fluid does not comprise a clay.

* * * * *